Feb. 13, 1934.          G. W. PICKARD          1,946,710
                        MAGNETIC COMPASS
                      Filed Dec. 6, 1928          2 Sheets-Sheet 1
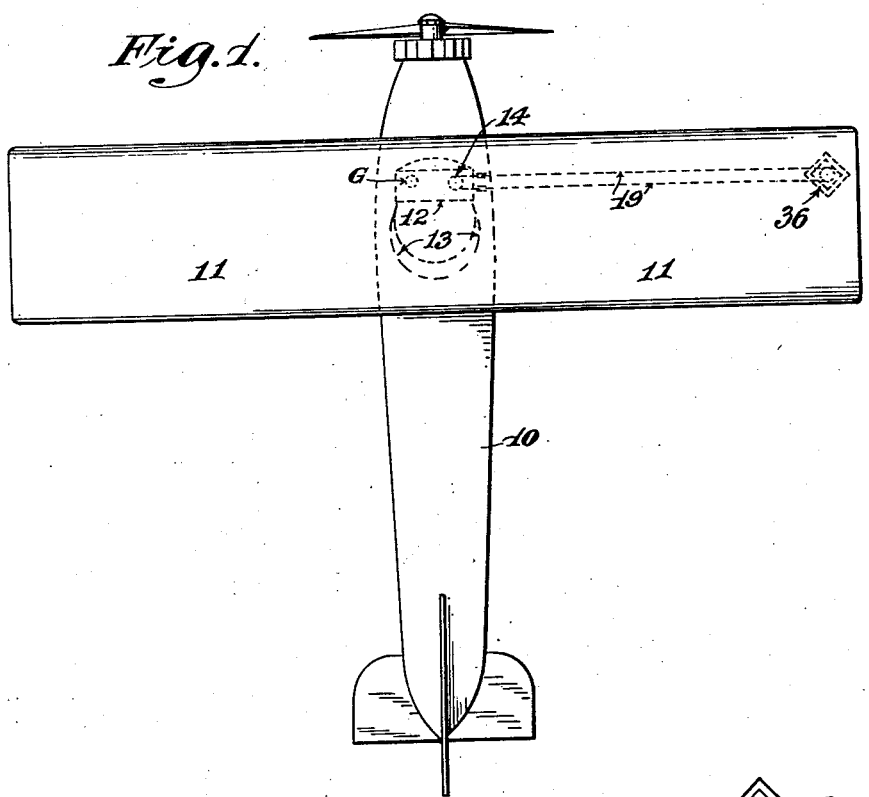
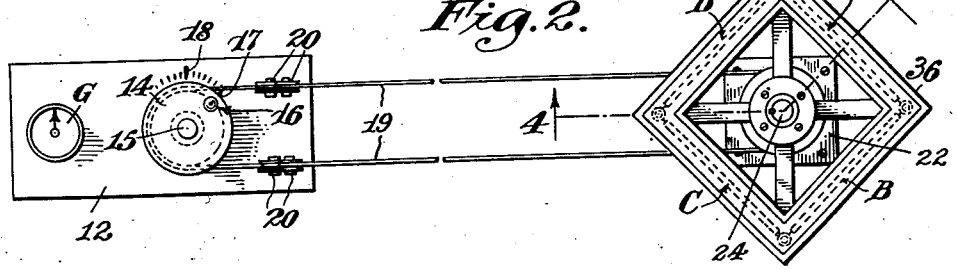
Inventor:
Greenleaf W. Pickard
By his Attorney
Philip Farnsworth Feb. 13, 1934. G. W. PICKARD 1,946,710
MAGNETIC COMPASS
Filed Dec. 6, 1928  2 Sheets-Sheet 2

Inventor:
Greenleaf W. Pickard
By his Attorney
Philip Farnsworth

Patented Feb. 13, 1934

1,946,710

UNITED STATES PATENT OFFICE 1,946,710

MAGNETIC COMPASS

Greenleaf Whittier Pickard, Newton Center, Mass., assignor, by mesne assignments, to General Electric Company, a corporation of New York Application December 6, 1928. Serial No. 324,211

5 Claims. (Cl. 33—204)

This invention relates to a compass and has for its object to provide a simple and reliable electric compass. Another object is to do away with the necessity for an operating motor such as is necessary with the present earth inductor compass used in air-ships. A further object is to provide an indicator responsive to changes in resistance of material with changes in magnetic flux density through it. Yet an additional object involves the selection of a material for such an indicator so that the material will have a substantial resistance variation with change in flux density of a comparatively weak field such as that due to the earth's magnetism.

Many materials have slight variations in their electric resistance with changes in flux density through the material, but in general the resistance change is a small one and of little practical use, especially of little use in anything but a very strong magnetic field. Bismuth, for example, in a magnetic field of 20,000 gauss changes its resistance by about two per cent, but in a weak magnetic field, such as is earth's field, which is of extremely low intensity relative to 20,000 gauss, the resistance changes with bismuth are negligible. In the recently discovered iron nickel alloys containing about 78 or 80 per cent nickel, the remainder being iron, and known commercially as permalloy, the change in resistance in a relatively weak field, such as the earth's field, is roughly around three per cent. When a permalloy rod is parallel with the lines of force of the earth's field its resistance is a maximum, but as the permalloy rod is moved from its position of parallelism the resistance decreases.

According to this invention this property of permalloy for changing its resistance in the earth's field according to its angular relation with the lines of force of the earth's field is made use of in the production of an electric compass. Specifically an elongated or oblong permalloy element constitutes one or more arms of a Wheatstone bridge. Changes in resistance of the permalloy with variation in the amount of the earth's flux travelling through it causes unbalance of the bridge and a galvanometer indicates when such condition takes place. The permalloy element or elements are mounted so as to give a zero galvanometer reading when the ship such as a plane, dirigible, water ship, etc. is going in the direction intended. Preferably these permalloy elements are mounted remote from any mass of magnetic material like that of the engine of the ship. A suitable place in a plane is remote from the cockpit, in or on the wing or tail, the indicator or galvanometer, being preferably placed on the instrument board. This permalloy element is mounted so as to be rotatably adjustable according to the desired direction of movement of the ship and on or adjacent the instrument board is located a dial for actuating and indicating the angle between the permalloy element or elements, and the ship's axis. The permalloy elements are adjusted once for each leg of a flight for example when used in a plane. These elements are preferably sealed in a container of non-magnetic material such as duralumin to protect the arms of the bridge against weather conditions and unequal temperature conditions which might introduce errors. In using two or more permalloy elements they are angularly disposed to each other, one in one arm and the other in another arm of the bridge, the galvanometer being placed across these two arms. If a conidtion of balance occurs with neither of the two angularly disposed parmalloy wires parallel nor normal to the direction of the earth's field then the galvanometer may indicate on which side of the desired direction deviation of the vehicle occurs.

Referring to the drawings:

Fig. 1 is a top plan view of a plane equipped with the invention.

Fig. 2 is a plan view of the spider containing the permalloy elements, instrument board and adjusting means for the spider.

Fig. 3 is an elevation of the parts shown in Fig. 2.

Figure 6:
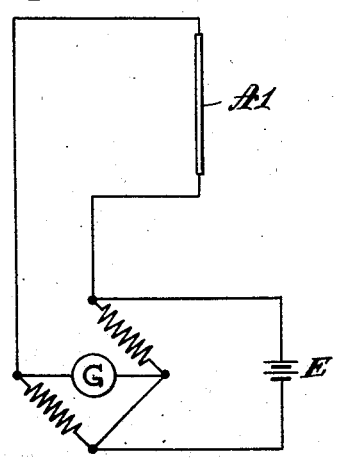
Figs. 6 and 7 illustrate modified diagrams of this invention.

In its simplest form the invention is illustrated in Fig. 6, wherein the oblong or elongated permalloy wire A1 constitutes one arm of the Wheatstone bridge provided with the usual galvanometer G and source of current E. When the element A1 is substantially parallel with the lines of force of the earth's field its resistance is a maximum, and as the angle between A1 and the direction of the earth's field increases up to 90° the resistance of the element A1 decreases and reaches a minimum when this element is arranged at 90° to the lines of force of the earth's field. From this explanation it will be apparent that if the permalloy element is made adjustable with respect to the ship axis on which it is placed, then when it is given a particular setting the galvanometer G will indicate deviations from the desired course. If the other arms of the bridge are given suitable values so that the galvanometer G has no current through it and the bridge is balanced when the permalloy element A1 is between positions parallel with and normal to the earth's field, then the galvanometer G may have its needle indicate on which side of the desired course the deviation of the ship occurs whether to the right or to the left.

Figure 7:
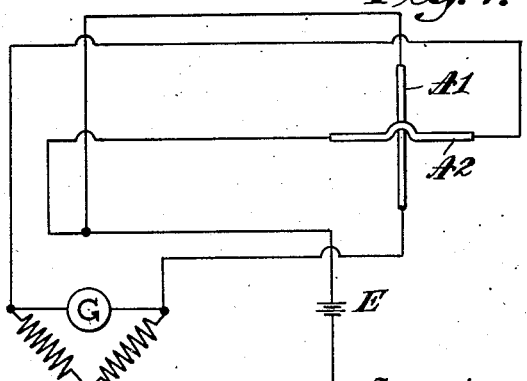

Fig. 7 illustrates an electric compass similar to that of Fig. 6 except that the instrument is made more sensitive by the use of two permalloy elements A1 and A2, each of which is in one arm of the Wheatstone bridge. The arrangement illustrated in Fig. 7 is twice as sensitive as that shown in Fig. 6 since the resistance changes are twice the size of Fig. 6 for the same size of permalloy elements.

Figure 4:
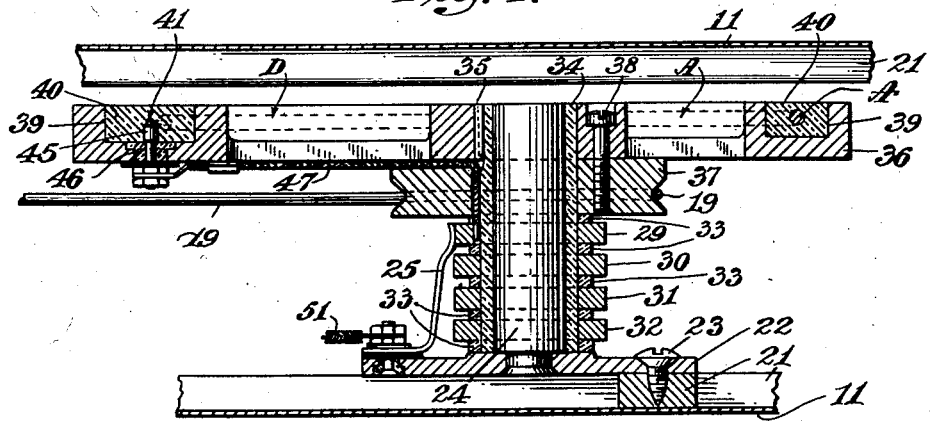
Fig. 4 is an enlarged irregular section on the line 4—4 of Fig. 2 showing construction of the spider.
Figure 5:
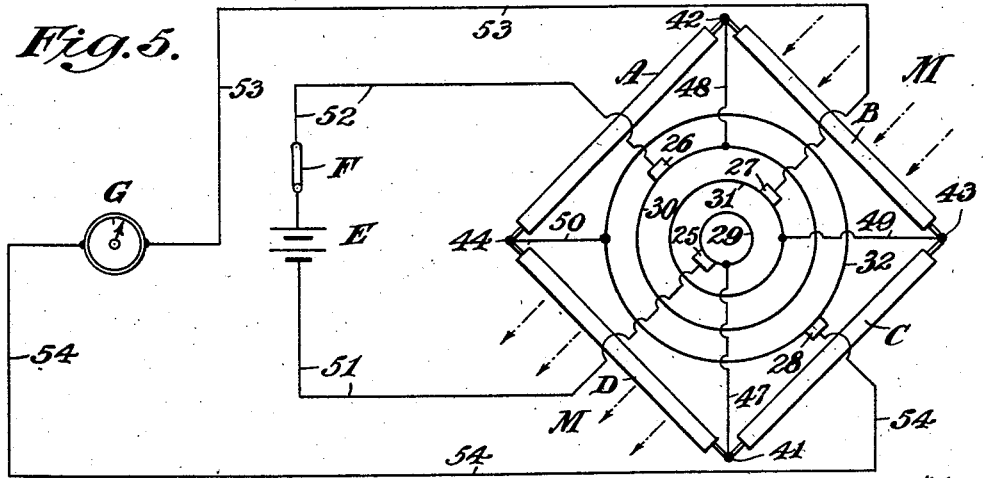
Fig. 5 is a wiring diagram showing the connections of the preferred form illustrated in Figs. 1 to 4 inclusive.

In Figs. 1 to 5 inclusive is illustrated the preferred embodiment of an invention in which the permalloy element is located in each arm of the Wheatstone bridge so as to give the maximum sensitiveness. In Fig. 5 four permalloy wires A, B, C and D constitute the several arms of a Wheatstone bridge supplied by the customary battery E and having the galvanometer G. To conserve the battery a switch F is placed in the battery circuit and may be closed only when it is desired to take a reading of the indicator G.

As illustrated in Fig. 1 the compass elements A, B, C, D are mounted at 36 on one end of the wings 11 remote from the instrument board 12 and cockpit 13 in the body 10 of the plane. As will be more clearly understood from Figs. 2 and 3 the four permalloy elements are made rotatably adjustable, being controlled at the instrument board by a setting wheel 14 mounted on a shaft 15 and provided with the handle 16 and the pointer 17 for cooperation with graduations 18 on the instrument board by means of which the spider 36 comprised of the permalloy elements may be adjusted at any desired angle for the intended course of the ship. A flexible cable 19 connects the adjustable spider 36 to the setting wheel 14, this flexible cable 19 passing over pulleys 20 from the setting wheel to the spider 36.

From Fig. 4 it can be more clearly seen that the spider 36 is mounted on a base 21 provided with a supporting plate 22, held in place by the screws 23 and carrying the shaft 24 which carries the four permalloy arms. The contact shoes 25, 26, 27 and 28, see Figures 4 and 5, engaging the collector rings 29, 30, 31 and 32 respectively. These rings are separated by insulating washers 32 and mounted on the insulating bushing 34, there being electrical connections shown in Fig. 5 from each collector ring to the desired arms of the bridge. The permalloy arms are sealed against weather conditions within the spider 36 of duralumin or other non-magnetic material. The spider is secured on the shaft by the key 35. The flexible cable 19 passes around the spider pulley 37 secured to the spider for rotation therewith by screws 38. The spider retains the permalloy rods in the troughs 39 which are sealed therein by suitable insulating material adapted to protect these permalloy elements. The connections between the arms is illustrated in Fig. 5 at 41, 42, 43 and 44. The permalloy wires are attached to binding posts 45 insulated from the duralumin spider by the insulating bushing 46. Connections 47, 48, 49 and 50 lead from the binding posts to the respective collector rings. The wires 51 and 52 in the battery circuit and the wires 53 and 54 of the galvanometer circuit are clearly indicated in Fig. 5. The dotted arrows M—M indicate the direction of the earth's magnetic lines of force. When the spider is disposed to the field as illustrated in Fig. 5, the arms A and C are of maximum resistance, while the arms B and D are of minimum resistance.

Preferably the arms should not be balanced in the position shown in Fig. 5 with the lines of force parallel or normal to the arms because deviation of the ship from the intended direction on either side causes the bridge to be unbalanced and the galvanometer reading to be the same regardless of on which side the ship goes off its course. If the bridge were so adjusted that it would be balanced, with the arms A and C, for example, arranged at 45° to the lines M—M, then the galvanometer G would indicate on which side of the intended direction the deviation occurred. If the ship got off the course on one side, the arms A and C would increase the resistance, whereas, if it got off in course on the other side these arms would decrease in resistance and the galvanometer would move in the opposite direction.

Due to the lines of force of the earth's field not being horizontal but inclined to the surface of the earth in the usual latitudes it will be desirable to mount the spider and its support within gimbal bearings, for example, to maintain it always horizontal since otherwise when used in an air-ship an error would result due to the ship climbing or descending, at which time the resistance of some of the arms would change with respect to their resistance when horizontal, due to their being more closely parallel with the inclined lines of force. When the spider is retained in a horizontal position there can be no change in resistance of the permalloy arms due to change in their flux density from the aeroplane ascending or descending.

I claim:

1. An electric ship-compass which includes a source of electric current, an electrical indicating instrument operated thereby, and a Wheatstone bridge varying the effect of said source on said instrument when the ship deviates from its course, at least one of the arms of said bridge including an oblong electrical conductor composed of material characterized by substantially different resistivity in various angular relations to the lines of the earth's magnetic field.

2. An electric ship-compass which includes a source of electric current, an electrical indicating instrument, and a Wheatstone bridge varying the effect of said source on said instrument when the ship deviates from its course, at least two of the arms of said bridge respectively including an oblong electrical conductor composed of material characterized by substantially different resistivity in various angular relations to the lines of the earth's magnetic field, said oblong conductors being arranged in angular relations to one another, and said indicating instrument being connected across the two arms of the bridge which include said angularly disposed oblong conductors.

3. In an electric ship-compass, the combination with a Wheatstone bridge and galvanometer, of an oblong member in at least two arms of said bridge, each of which oblong members is adapted to change its resistance with a change in the angle between itself and the lines of force of the earth's magnetic field, said oblong members being disposed angularly to each other and mounted in a container of non-magnetic material.

4. In an electric ship-compass, the combination with a Wheatstone bridge and galvanometer, of an oblong member in at least two arms of said bridge, each of which oblong members is adapted to change its resistance with a change in the angle between itself and the lines of force of the earth's magnetic field, said oblong members being angularly disposed to each other and arranged with the galvanometer connected across the arms containing them.

5. An electric ship-compass which includes a source of electric current, an electrical indicating instrument operated thereby, and a Wheatstone bridge varying the effect of said source on said instrument, the four arms of said bridge each including an oblong electrical conductor composed of material characterized by substantially different resistivity in various angular relations to the lines of the earth's magnetic field.

GREENLEAF WHITTIER PICKARD.